(12) United States Patent
Baccini

(10) Patent No.: US 6,523,555 B2
(45) Date of Patent: Feb. 25, 2003

(54) DEVICE FOR WASHING AND DRYING FOODS, FOR EXAMPLE VEGETABLES

(75) Inventor: Giovanni Baccini, Florence (IT)

(73) Assignee: Hutzler Manufacturing Co., Inc., Canaan, CT (US)

( * ) Notice: Subject to any disclaimer, the term of this patent is extended or adjusted under 35 U.S.C. 154(b) by 116 days.

(21) Appl. No.: 09/746,988

(22) Filed: Dec. 22, 2000

(65) Prior Publication Data
US 2002/0078983 A1 Jun. 27, 2002

(51) Int. Cl.[7] .................................................. B08B 3/04
(52) U.S. Cl. ........................ 134/109; 134/117; 134/182; 134/201; 99/536
(58) Field of Search .......................... 134/109, 110, 134/117, 182, 183, 201; 99/536

(56) References Cited

U.S. PATENT DOCUMENTS

| | | | | |
|---|---|---|---|---|
| 1,245,768 | A | * | 11/1917 | Randall |
| 2,857,947 | A | * | 10/1958 | Powers |
| 4,209,916 | A | * | 7/1980 | Doyel |
| 4,390,104 | A | * | 6/1983 | Cummings |
| 4,626,352 | A | * | 12/1986 | Massey et al. |
| 4,754,896 | A | * | 7/1988 | Roltgen et al. |
| 4,901,881 | A | * | 2/1990 | McElory |
| 4,944,051 | A | * | 7/1990 | Porter |
| 5,064,535 | A | * | 11/1991 | Hsu |
| 5,122,272 | A | * | 6/1992 | Iana et al. |
| 5,671,664 | A | * | 9/1997 | Jacobson |
| 5,771,792 | A | * | 6/1998 | Chen |
| 5,919,365 | A | * | 7/1999 | Collette |

FOREIGN PATENT DOCUMENTS

| | | | |
|---|---|---|---|
| FR | 2617624 | * | 1/1989 |
| JP | 1-244764 | * | 9/1989 |
| JP | 7-263135 | * | 10/1995 |
| JP | 2000-185761 | * | 7/2000 |

OTHER PUBLICATIONS

WO89/07434 Aug. 1989.*

* cited by examiner

Primary Examiner—Frankie L. Stinson
(74) Attorney, Agent, or Firm—Michael J. Striker

(57) ABSTRACT

A device for washing and drying foods has an elastic sleeve-shaped body having two opposite ends, one of the ends being fixable elastically and water tightly onto an edge of a container, a filter provided with a plurality of openings for water to run through and arranged in another end of the body and a closing cap adapted to close and to open the filter.

13 Claims, 1 Drawing Sheet

DEVICE FOR WASHING AND DRYING FOODS, FOR EXAMPLE VEGETABLES

BACKGROUND OF THE INVENTION

The present invention relates to accessories for kitchen and more particularly to a device for washing and drying vegetables and other foods contained inside, for example, a cooking pot.

Conventionally, normal colanders are utilized for washing and drying vegetables. Recently, salad spinners have been introduced, and containers provided with an internal basket which is rotatable by a gear operated manually, so as to separate by spinning the water from the vegetables which remain together in the basket. These accessories are of doubtful efficiency, because they do not allow to wash foods properly, leaving residual on the same. Moreover, the colander and the salad spinner take up a lot of space and in the case of the salad spinner are complicated to clean from residuals of vegetables and also are relatively costly because of the gear mechanism and numerous other components.

SUMMARY OF THE INVENTION

Accordingly, it is an object of present invention to provide a device for washing and drying foods, which avoids the disadvantages of the prior art.

In keeping with these objects and with others which will become apparent hereinafter, one feature of present invention resides, briefly stated in a device for washing and drying foods, which has a stretchable sleeve-shape body having one end adapted to water tightly fit over an edge of a container, and an opposite end provided with a filter being closable by a cap.

When the device is designed in accordance with the present invention, it is extremely simple, it does not take much space, it has a low production cost. The device is extremely convenient to use, it is adaptable to containers of various forms and dimensions, it has a limited number of components and has a low production cost. Also, after the use the elastic body can be placed inside the filter, taking up minimum space.

With the inventive device only one operation is necessary to wash and dry foods. Also, once foods are washed with the inventive device, the foods are already in the cooking pot, ready to be cooked. Furthermore, the elastic body allows to keep air tight the foods contained in the pot, and keep it for example in a refrigerator. Furthermore, the elastic body allows to dress food directly in the pot after the end of the operation of the washing and drying. Also, the hands of the operator never come into contact with water, remaining dry even after washing and drying has been done.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
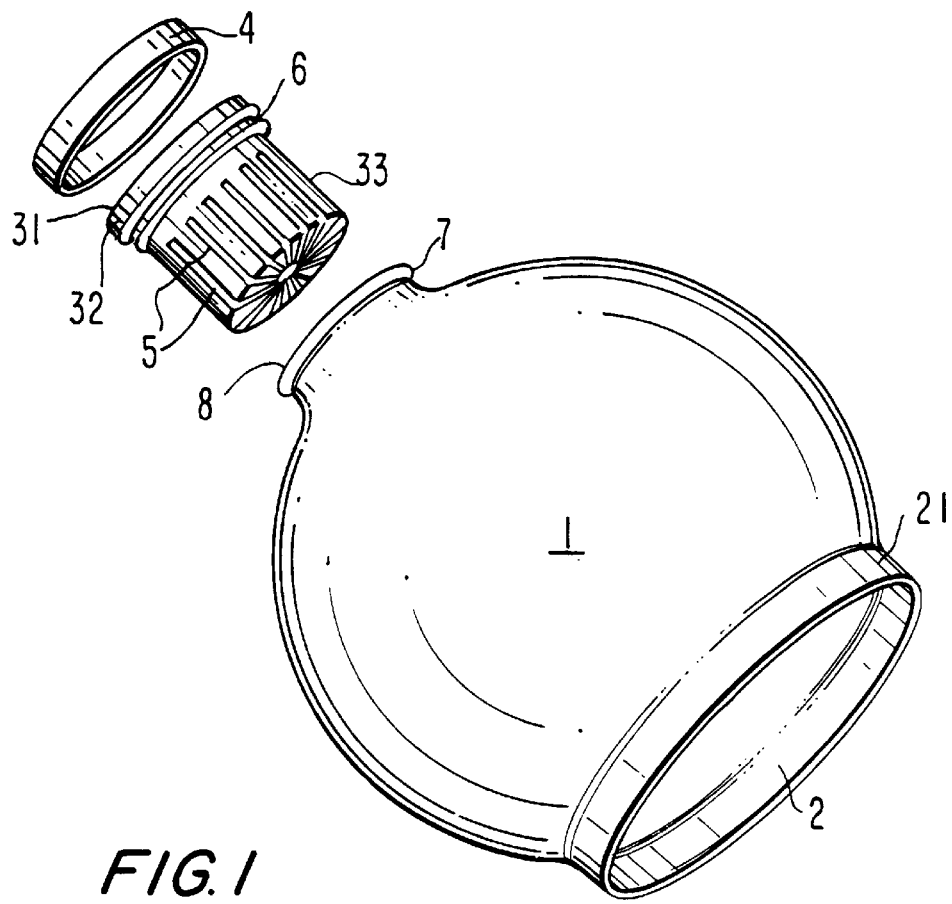
FIG. 1 is a perspective exploded view of a device for washing and drying foods in accordance with the present invention.
Figure 2:
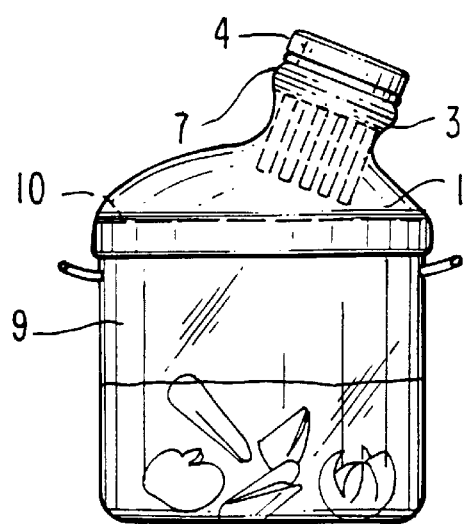
FIG. 2 is a view showing a cooking pot full of vegetables and water and the inventive device assembled onto the pot.

A device for washing and drying foods in accordance with the present invention has a sleeve-like body 1 which is composed of an elastic material. The body 1 is opened at its two opposite ends 2 and 8. The body 1 at the end 2 has an approximately cylindrical portion 21. At the opposite end 8 the body has a reinforced a cylindrical portion 81 with edge or lip 7. The central part of the body 1 between the ends 2 and 8 has a substantially curved, convex profile. A filter 3 is inserted in the opening of the body 1 at the end 8. The filter 3 has a substantially cylindrical shape with an upper end 31 provided with an opening, a continuous wall collar 32 extending from the opening, and a lower part with a grating 33 provided with a plurality of openings 5. The openings 5 first extend in an axial direction on a wall of the filter and then in a radial direction on its bottom and are formed as slots.

The collar 32 of the filter 3 has a smooth area adjacent to the end 31, and immediately under it, a circular groove 6 formed between two round protuberances. The circular groove 6 is adapted to hold the lip 7 of the body 1. It is to be understood that other means can be used to keep the body 1 on the filter 3. The device further has a cap 4 which closes and opens the filter 3.

In order to assemble the inventive device for washing and drying, the filter 3 is inserted into the body 1 at its end 8 so that the grating 33 remains inside the body, and the reinforcing lip 7 is engaged in the groove 6. In order to use the device, it is sufficient to elastically deform the end 2 of the body 1 adapt it to the edge of a container 9, which in the shown embodiment is a cooking pot with foods inside to be washed. The pot is then partially filled with water through the filter 3, and the filter is closed with the cap 4. For providing more efficient washing, the pot 9 is then turned upside down and intensely agitated. The risk of filter leakage is avoided because the adhesive between the body and the pot is guaranteed by the elasticity of the body 1.

As shown in the drawings, the filter 3 extends inside the body 1 so as to prevent the food from occluding of the opening of the grating and to improve the "draugh" during the water distribution. When the weight of the water deforms the elastic body 1, this deformation provokes a depression inside the body and therefore a better adhesion at the edge of the pot. The body is capable of sustaining the weight of a considerable quantity of vegetables and water for washing.

After the washing, the cap 4 is removed from the filter 3, the pot is turned upside down, and the water runs out through the opening 5, while the vegetables are kept inside the pot by the filter 3. The weight of the water running out of the filter 3 provides repeated deformation of the body 1 with successive elastic returns from the same. This provides an extensive agitation of the water due to the repetition of the deformation and consequent elastic return, with an alternate action of blowing and bubbling of the water through the filter 3. Therefore, a considerable improvement of the washing is provided.

In a preferred embodiment, the body 1 is composed of silicone rubber. However, it is possible to use also latex rubber or other types of rubber. The filter 3 and the cap 4 are composed of plastic.

It will be understood that each of the elements described above, or two or more together, may also find a useful application in other types of constructions differing from the types described above.

While the invention has been illustrated and described as embodied in device for washing and drying foods, for example vegetables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims:

What is claimed is:

1. A device for washing and drying foods, comprising an elastic sleeve-shaped body having two opposite ends, one of said ends being fixable elastically and water tightly onto an edge of a container; a filter provided with a plurality of openings for water to run through and arranged in another end of said body; and a closing cap adapted to close and to open said filter.

2. A device as defined in claim 1, wherein a body has a section located adjacent to said one end and being substantially cylindrical, a section located adjacent to said other end and being substantially cylindrical, and a central part located between said ends and having a substantially convex profile.

3. A device as defined in claim 1, wherein said body at said other end has a thickened edge.

4. A device as defined in claim 1, wherein said filter is cup shaped.

5. A device as defined in claim 4, wherein said filter has a substantially cylindrical container wall portion, and a cage-shaped portion provided with a plurality of openings.

6. A device as defined in claim 5, wherein said openings extend on a peripheral wall of said filter and also on a bottom of said filter and are formed as slots.

7. A device as defined in claim 1, wherein said body has a thicker edge, said filter having a circular groove in which said edge is engageable.

8. A device as defined in claim 7, wherein said filter has two circular protuberances forming said circular groove therebetween.

9. A device as defined in claim 1, wherein said closing cap is substantially cylindrical and adapted to close said filter in a water tight manner.

10. A device as defined in claim 1, wherein said body is composed of silicone rubber.

11. A device as defined in claim 1, wherein said body is composed of latex.

12. A device as defined in claim 1, wherein said filter and said cap are composed of a plastic material.

13. A device as defined in claim 1, wherein said filter is formed so that it has an inner cavity formed to receive said body when said filter is not being used.

* * * * *